United States Patent
Lemeur, Jr. et al.

(10) Patent No.: US 7,093,319 B2
(45) Date of Patent: *Aug. 22, 2006

(54) INDUSTRIAL CASTER WHEEL WITH ELASTOMERIC SPRING/DAMPER MEMBER AND ADJUSTMENT MEMBER

(75) Inventors: Henri E. Lemeur, Jr., Warren, PA (US); John D. Swartz, Tidioute, PA (US); David J. Manning, Tidioute, PA (US)

(73) Assignee: Superior Tire & Rubber Corporation, Warren, PA (US)

( * ) Notice: Subject to any disclaimer, the term of this patent is extended or adjusted under 35 U.S.C. 154(b) by 363 days.

This patent is subject to a terminal disclaimer.

(21) Appl. No.: 10/658,198

(22) Filed: Sep. 10, 2003

(65) Prior Publication Data

US 2004/0055108 A1   Mar. 25, 2004

Related U.S. Application Data

(63) Continuation-in-part of application No. 10/183,477, filed on Jun. 28, 2002, now abandoned.

(51) Int. Cl.
*B60B 33/00* (2006.01)
(52) U.S. Cl. ............. 16/44; 16/32; 16/105; 16/45
(58) Field of Classification Search ............. 16/44, 16/45, 35 D, 18 R, 29, 32–34, 105, DIG. 36; 267/102, 141, 140.11, 195
See application file for complete search history.

(56) References Cited

U.S. PATENT DOCUMENTS

| | | | | |
|---|---|---|---|---|
| 2,442,831 A | 6/1948 | Suttles | ............... | 16/44 |
| 2,738,542 A | 3/1956 | Clark | ............... | 16/44 |
| 3,041,656 A | 7/1962 | Goodall | ............... | 16/44 |
| 3,518,714 A | 7/1970 | Hager | ............... | 16/35 R |
| 3,827,104 A * | 8/1974 | Lambertz | ............... | 16/18 R |
| 4,006,513 A * | 2/1977 | Offterdinger | ............... | 16/99 |
| 4,189,870 A * | 2/1980 | Helmick | ............... | 49/420 |
| 4,485,521 A | 12/1984 | Welsch et al. | ............... | 16/44 |
| 4,559,669 A | 12/1985 | Bonzer et al. | ............... | 16/44 |
| 4,763,910 A | 8/1988 | Brandli et al. | ............... | 280/29 |
| 5,347,680 A | 9/1994 | Rippe | ............... | 16/19 |
| 5,400,469 A | 3/1995 | Simonsen | ............... | 16/44 |
| 5,448,796 A | 9/1995 | Larson | ............... | 16/44 |
| 6,279,199 B1 | 8/2001 | Plate | ............... | 16/19 |
| 6,425,161 B1 | 7/2002 | LeMeur et al. | ............... | 16/44 |
| 6,499,184 B1 | 12/2002 | Plate | ............... | 16/44 |

* cited by examiner

*Primary Examiner*—Chuck Y. Mah
*Assistant Examiner*—Michael J. Kyle
(74) *Attorney, Agent, or Firm*—Lathrop & Clark LLP

(57) ABSTRACT

An industrial caster wheel assembly including a base member, a wheel, side plates, a housing, a pivot axle, a suspension assembly and an adjustment assembly. The suspension assembly includes an adjustable axle, a support member, and a plate. The support member allows one of the wheel and the base member to rotate about the pivot axle as the adjustable axle compresses the support member by contacting the plate. The adjustment assembly adjusts the height of the industrial caster wheel by adjusting the pressure applied by the adjustable axle to the support member. The industrial caster wheel assembly may alternatively include at least one adjustment assembly that can be placed in contact with at least one of the second axle to press the second axle at least indirectly against the elastomeric support member or the first axle to press the first axle toward the center of the housing.

33 Claims, 11 Drawing Sheets

INDUSTRIAL CASTER WHEEL WITH ELASTOMERIC SPRING/DAMPER MEMBER AND ADJUSTMENT MEMBER

This is a Continuation-in-Part of application Ser. No. 10/183,477 filed Jun. 28, 2002 now abandoned. The entire disclosure of the prior application is hereby incorporated by reference herein in its entirety.

BACKGROUND OF THE INVENTION

1. Field of Invention

The invention relates to industrial caster wheels.

2. Description of Related Art

Industrial caster wheels are used, for example, as stabilizer casters on a pallet truck. Such pallet trucks have a single drive wheel and one industrial caster wheel on each side. Usually, the industrial caster wheel has a spring member that absorbs shocks while traveling. The spring member also provides stability as the object to which the industrial caster wheel is attached travels over rough surfaces.

SUMMARY OF THE INVENTION

Conventional industrial caster wheels use mechanical springs. The spring member is limited in travel due to bottoming out, which occurs due to poor shock absorbing characteristics. Previous efforts to replace mechanical springs with elastomeric members have generally been unsuccessful. These previous industrial caster wheels have used torsional elastomeric elements. However, these torsional-elastomeric-member-type industrial caster wheels have experienced significant performance degradation as the torsional elastomeric member abrades with usage. This abrasion occurs due to sliding contact with a housing for the torsional elastomeric member.

This invention provides an industrial caster wheel assembly that has an improved life span.

This invention separately provides an industrial caster wheel that has an improved spring response.

This invention separately provides an industrial caster wheel that has an elastomeric member that acts as both a spring and a damper.

This invention separately provides an industrial caster wheel that requires fewer parts to provide the spring response.

This invention separately provides an industrial caster wheel that allows the height of the industrial caster wheel to be adjusted.

This invention separately provides an industrial caster wheel that allows the height of the industrial caster wheel to be adjusted by one to two inches.

This invention separately provides an industrial caster wheel that allows a preload pressure applied to an elastomeric member to be adjustable.

This invention separately provides an industrial caster wheel that allows the height of the industrial caster wheel to be adjusted without applying or removing an additional pressure to or from an elastomeric member.

In various exemplary embodiments of the industrial caster wheel according to this invention, an industrial caster wheel assembly includes a base member and a housing that supports the base member. The base member has an upper surface and a lower surface. The industrial caster wheel also includes a wheel that has an adjustable wheel axle that supports the wheel about a first axis. The industrial caster wheel has a number of side plates. Each of the side plates has an inside wall facing the wheel. At least some of the side plates engage the wheel axle.

A pivot axle is supported by at least some of the side plates and extends through the housing and those side plates. The pivot axle rotates about a second axis. The industrial caster wheel has a suspension assembly. The suspension assembly has an adjustable axle that extends through the housing and at least some of the side plates and an elastomeric support member and a plate. The elastomeric support member resists pivot movements of the side plates that tend to push the pivot axle toward the base member.

The industrial caster wheel also includes an adjustment member that adjusts a position of the adjustable axle relative to the elastomeric support member. As such, the preload pressure applied to the elastomeric support member is adjustable. Also, when the adjustment member adjusts position of the adjustable axle relative to the elastomeric support member, the adjustable axle also moves the side plates relative to the housing. As such, the height of the caster wheel assembly is adjustable as the slide plates moves relative to the housing.

In some exemplary embodiments, the adjustable axle compresses the elastomeric support member by contacting the plate at approximately the midpoint of a first dimension of the elastomeric support member.

The industrial caster wheel also includes at least one adjustment member. A first adjustment member adjusts a position of the adjustable axle relative to the elastomeric support member. As such, the preload pressure applied to the elastomeric support member is adjustable. Also, when the first adjustment member adjusts the position of the adjustable axle relative to the elastomeric support member, the adjustable axle also moves the side plates relative to the housing. As such, the height of the caster wheel assembly is adjustable as the slide plates move relative to the housing. A second adjustment member adjusts a position of the pivot axle. When the second adjustment member adjusts the position of the pivot axle, the pivot axle moves the side plates relative to the housing. As such, the height of the caster wheel assembly is adjustable as the side plates move relative to the housing. As such, the height of the caster wheel assembly can be adjusted independently of any adjustments to the preload pressure applied to the elastomeric support member by adjusting the first adjustment member to change the position of the adjustment axle relative to the housing.

These and other features and advantages of this invention are described in or are apparent from the following detailed description of the preferred embodiments.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
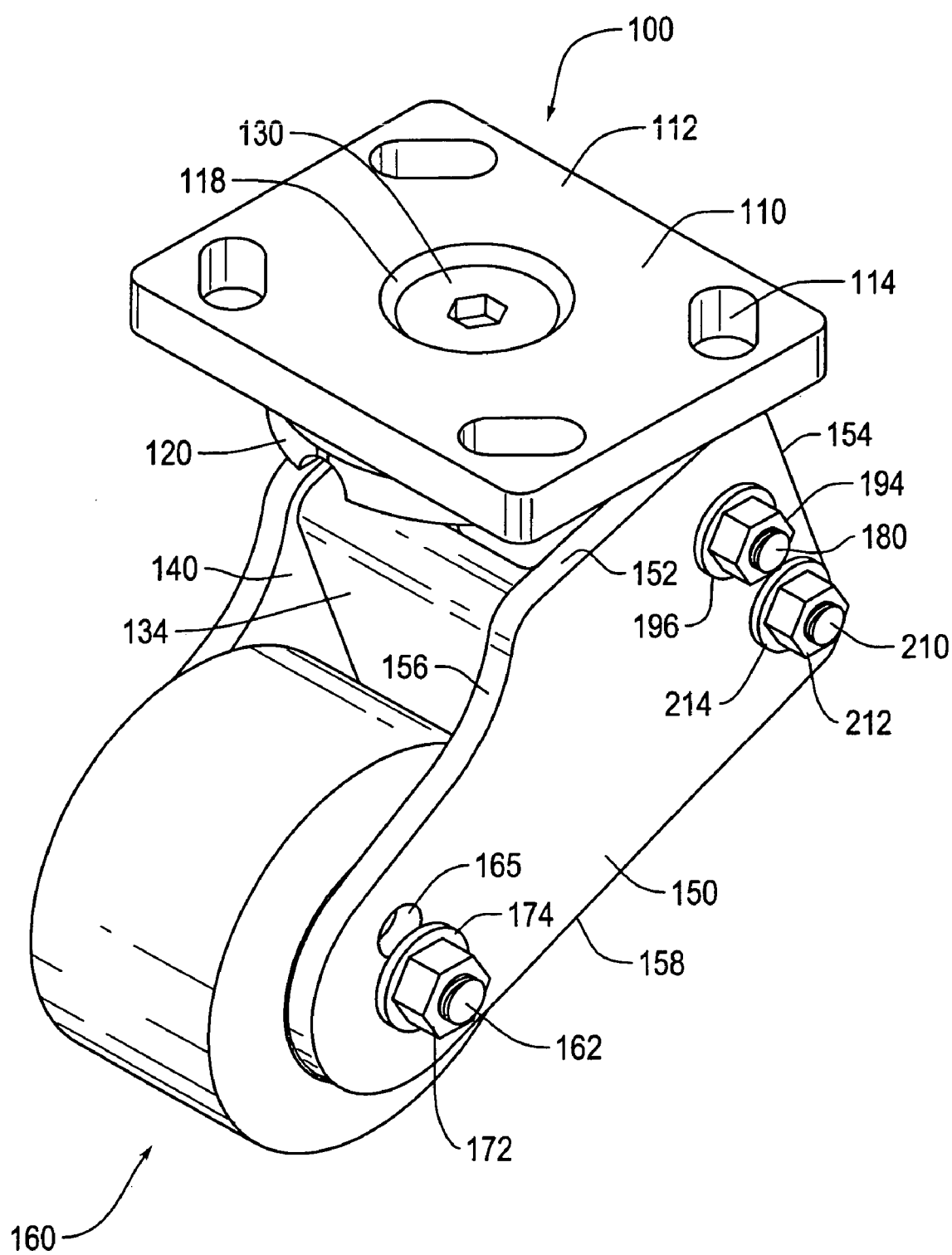
FIG. 1 is an isometric view of a first exemplary embodiment of a sprung caster wheel assembly according to this invention.
Figure 2:
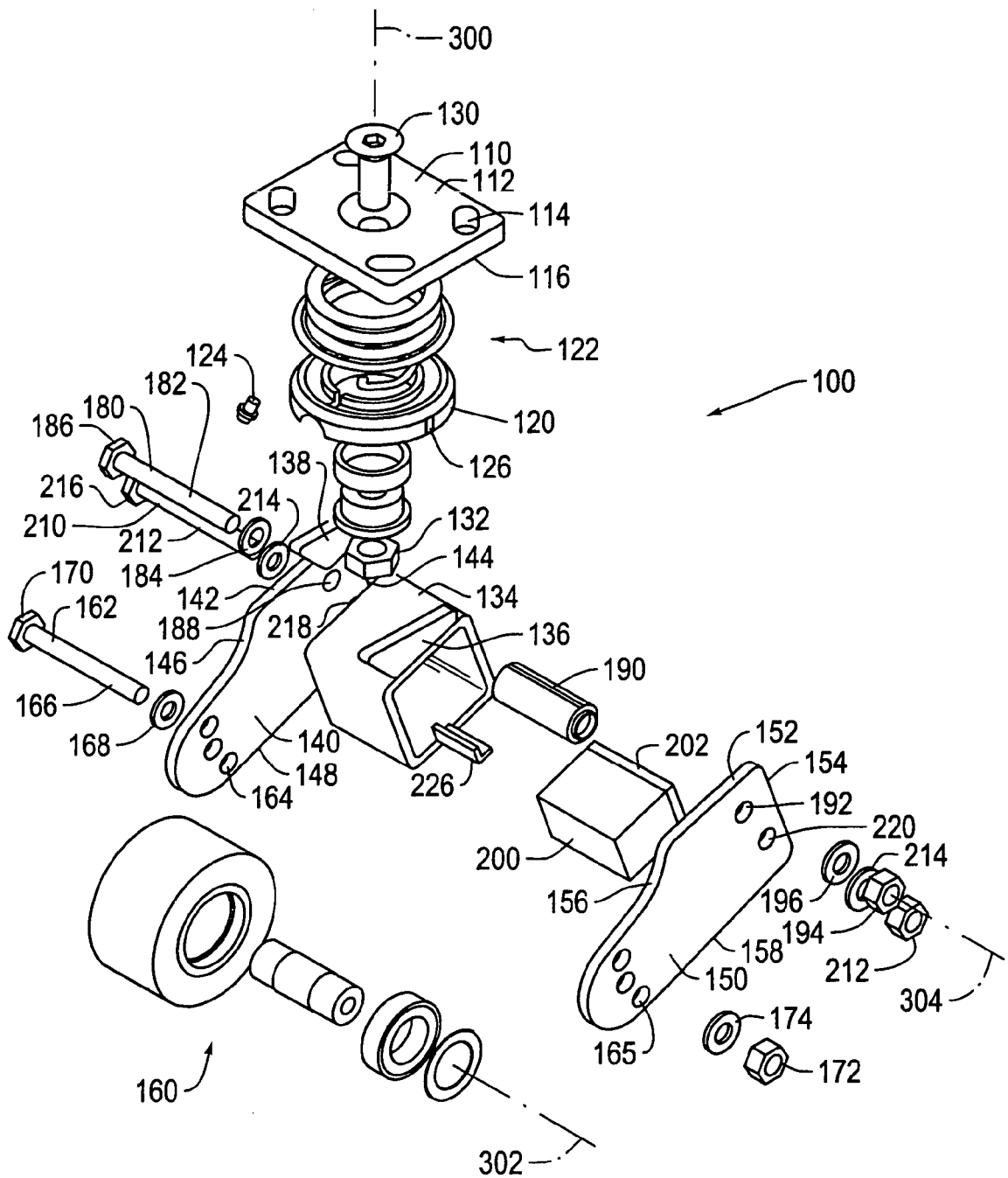
FIG. 2 is an exploded view of the caster wheel assembly of FIG. 1.
Figure 3:
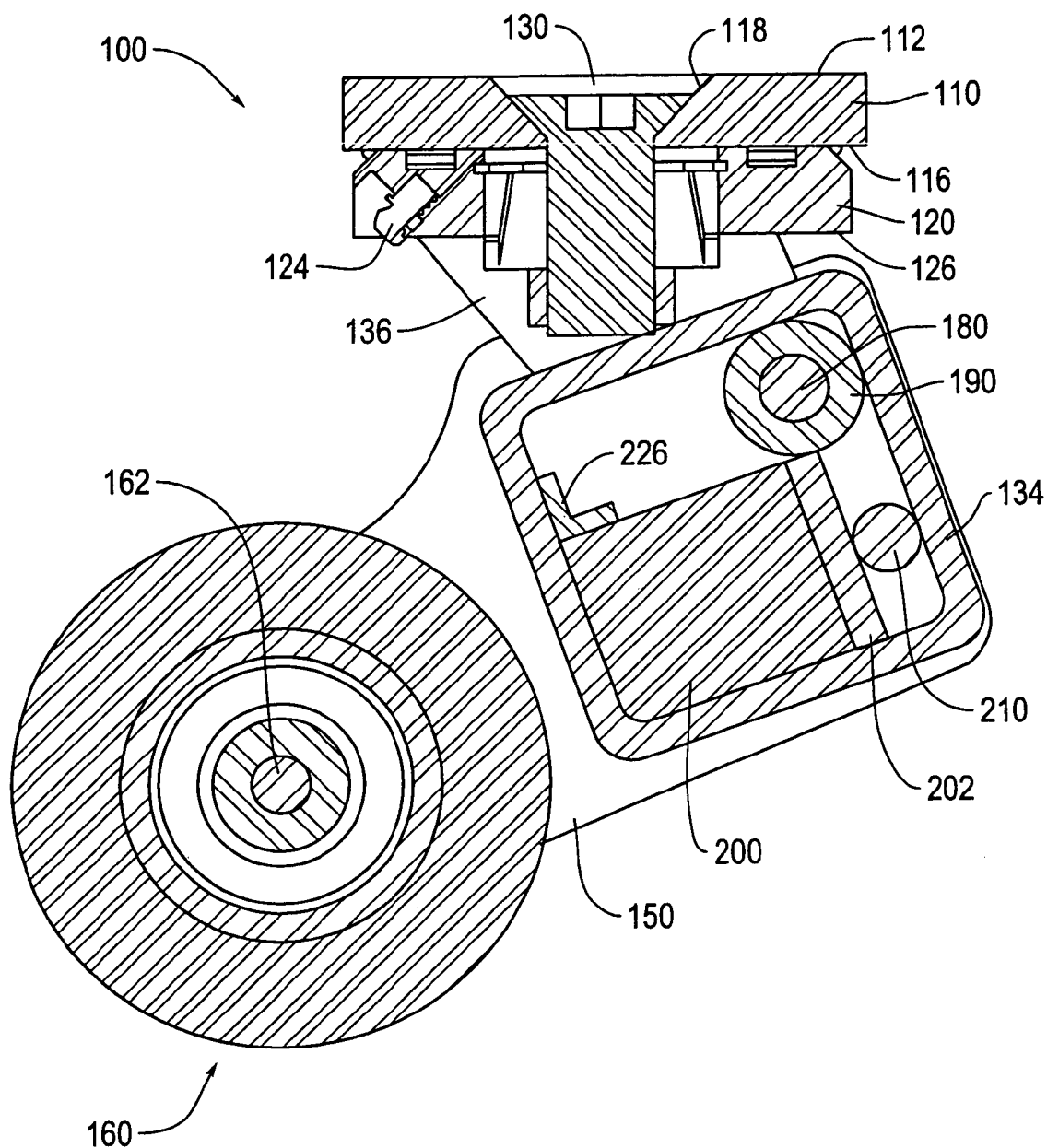
FIG. 3 is a vertical cross sectional view through the caster wheel assembly of FIG. 1.

FIGS. 1–4 illustrate a first exemplary embodiment of an industrial caster wheel assembly 100 according to this invention. As shown in FIGS. 1–4, the industrial caster wheel assembly 100 includes a mounting base 110 having a first surface 112. The mounting base 110 also includes a plurality of holes 114 usable to mount the mounting base 110 to an object. As shown in FIG. 3, the mounting base 110 also includes an second surface 116 to which a housing base 120 is attached. As shown in FIG. 2, the housing base 120 includes a swivel bearing assembly 122.

The mounting base 110 also includes a recess 118 in the first surface 112. A screw 130 extends through the recess 118 of the mounting base 110, the housing base 120, and the swivel bearing assembly 122. As shown in FIG. 2, a nut 132 can be screwed onto the screw 130. The industrial caster wheel assembly 100 thus forms a bearing assembly, having a grease fitting 124, so that the swivel bearing assembly 122 rotates about an axis 300.

Figure 4:
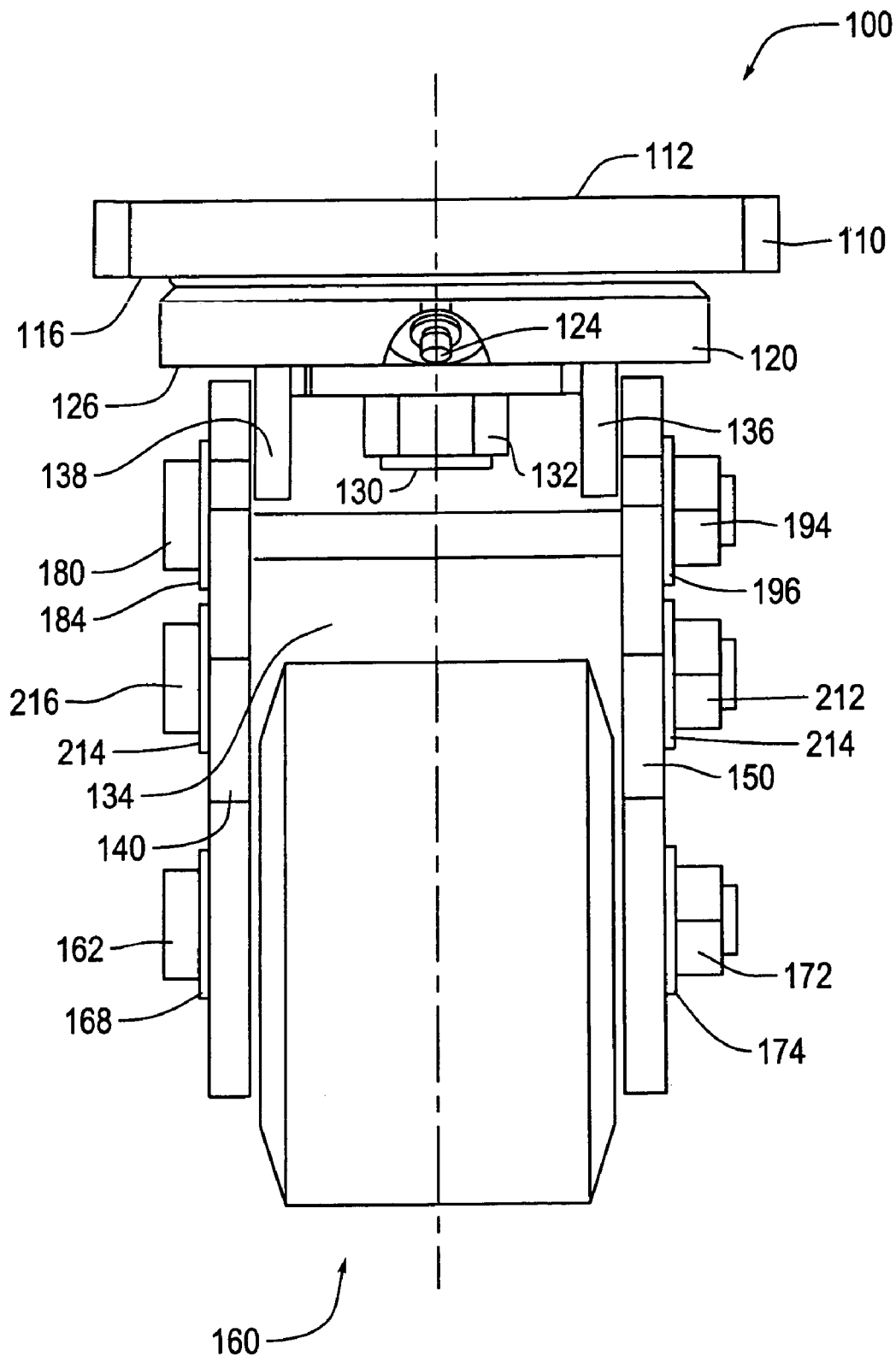
FIG. 4 is a plan view of the caster wheel assembly of FIG. 1.

As shown in FIGS. 2 and 4, the industrial caster wheel assembly 100 also includes a pair of support plates 136 and 138. As shown in FIG. 4, the support plates 136 and 138 are located between side plates 140 and 150, respectively, and are located roughly adjacent to a first side 126 of the housing base 120. Additionally, the nut 132 is located between the support plates 136 and 138, as shown in FIG. 4.

The industrial caster wheel assembly 100 further includes a wheel assembly 160 mounted on a wheel axle 162. As shown in FIG. 2, the side plates 140 and 150 each includes a plurality of holes 164 and 165, respectively. The location of the holes 164 and 165 can be varied to adjust the height of the caster wheel assembly 100. The wheel axle 162 includes a bolt 166 having a washer 168 and a head 170 engaging one of the side plates 140 or 150. The bolt 166 extends through one of the holes 164 or 165 of a first one of the side plates 140 or 150, through the wheel assembly 160, through the opposed hole 165 or 164 of the second one of the side plates 150 or 140. A nut 172 and a washer 174 are screwed onto the bolt 166 and tightened against the outside surface of the second one of the side plates 140 or 150. In various exemplary embodiments, the wheel assembly 160 includes suitable bearings and bushings, as known in the art. The wheel assembly 160 rotates about a wheel axis 302.

The side plates 140 and 150 include a first edge 142 and 152, a first side 146 and 156, a second side 148 and 158 and a second edge 144 and 154, respectively. In various exemplary embodiments, the first edge 142 and 152, the first side 146 and 156, the second side 148 and 158, and the second edge 144 and 154 can be curved. The first edges 142 and 152 can be used to provide a deflection stop when the industrial caster wheel assembly 100 is under full deflection. That is, the first edges 142 and 152 can contact, or align with, the mounting base 110 when the industrial caster wheel assembly 100 is under full deflection. In various exemplary embodiments, in a normal, unstressed, position of the industrial caster wheel assembly 100, the first edges 142 and 152 of the side plates 140 and 150 can be aligned with a housing 134.

The industrial caster wheel assembly 100 also includes a pivot axle 180. As shown in FIG. 3, the pivot axle 180 includes a bolt 182 having a washer 184 and a head 186 that engages a first one of the side plates 140 or 150. The bolt 182 extends through a hole 188 or 192 formed in the first one of the side plates 140 and 150, through the housing 134, through a pivot bushing 190, and through the opposing hole 188 or 192 formed in the second one of the side plates 140 or 150. A nut 194 and a washer 196 are screwed onto the bolt 182 and tightened against the outside surface of the plates 140 or 150. The pivot axle 180 allows the wheel assembly 160 and the side plates 140 and 150 to rotate relative to the housing 134, the second bearing assembly 122, the housing base 120 and the mounting base 110 about a pivot axis 304.

The pivot bushing 190 is attached to the housing 134. In various exemplary embodiments, the pivot bushing 190 is attached to the housing 134 by welding it to the housing 134. However, it should be appreciated that the pivot bushing 190 can be attached by an appropriate known or later developed attachment method. It should also be appreciated that, in various exemplary embodiments, it is not necessary to attach the pivot bushing 190 to the housing 134. In various exemplary embodiments, the pivot bushing 190 is located in a corner of the housing 134 adjacent to an elastomeric support member 200 as shown in FIG. 3. However, it should also be appreciated that the pivot bushing 190 can be located at any appropriate position within the housing 134.

The industrial caster wheel assembly 100 also includes the elastomeric support member 200. In various exemplary embodiments, the elastomeric support member 200 is attached to a plate 202. The combined width w of the elastomeric support member 200 and the plate 202 are less than the interior width W of the housing 134. In FIG. 3, the height h, the width w and the length l of the elastomeric support member 200 can each be any appropriate value.

In particular, the values for the dimensions h, w and l of the elastomeric support member 200 and the plate 202 are chosen to achieve a desired deflection or a desired deflection response, as discussed below with respect to FIG. 6. In various exemplary embodiments, the elastomeric support member 200 is of a cylindrical shape with the dimensions of the elastomeric support member 200 and the plate 202 less than the interior width W of the housing 134. However, it should be appreciated that the elastomeric support member 200 can be of any desirable shape or dimension so long as the elastomeric member 200 provides the desired deflection and/or desired deflection response. This desired deflection response is described in greater detail below with respect to FIG. 6.

The industrial caster wheel assembly 100 also includes an adjustable axle 210. As shown in FIG. 3, the adjustable axle 210 includes a bolt 212 having a washer 214 and a head 216 that engages a first one of the side plates 140 or 150. As shown in FIG. 2, the bolt 212 extends through a hole 218 or 220 formed in the first one of the side plates 140 and 150, through the housing 134, through the opposing hole 218 or 220 formed in the second one of the side plates 140 or 150. A nut 212 and a washer 214 are screwed onto the bolt 212 and tightened against the outside surface of the plates 140 or 150. A tab 226 can be placed on the inside of the housing 134. If used, the tab 226 resists movement of the elastomer support member 200.

The elastomeric support member 200 is compressed when the adjustable axle 210 contacts the plate 202. In various exemplary embodiments, the adjustable axle contacts the plate 202 at approximately the midpoint of a first dimension of the elastomeric support member 200. However, it should be appreciated that the adjustable axle 210 can contact the plate 202 at any appropriate location.

In various exemplary embodiments, the side plates 140 and 150 each includes a plurality of holes formed in the side plates 140 and 150. The locations of the holes can be chosen so that the adjustable axle 210 rotates around the pivot axle 180. The locations of the holes can also be chosen so that the adjustable axle 210 compresses the variably shaped elastomeric support member 200.

In operation, the wheel assembly 160 rests against a surface ground and rotates about the wheel axle 302. The wheel assembly 160 and the side plates 140 and 150 deflect by rotating about the pivot axis 304 of the pivot axle 180. The caster wheel assembly 100 can also rotate by rotating about the axis 300.

Suspension is provided as the elastomeric support member 200 allows one of the wheel assembly 160 and the mounting base 110 to rotate about the pivot axle 180 as the adjustable axle 210 compresses the elastomeric support member 200 by contacting the plate 202. The elastomeric support member 200 thus acts as a spring suspension and damper that resists the upward movement by accommodating shock loads due to impact.

Figure 5:
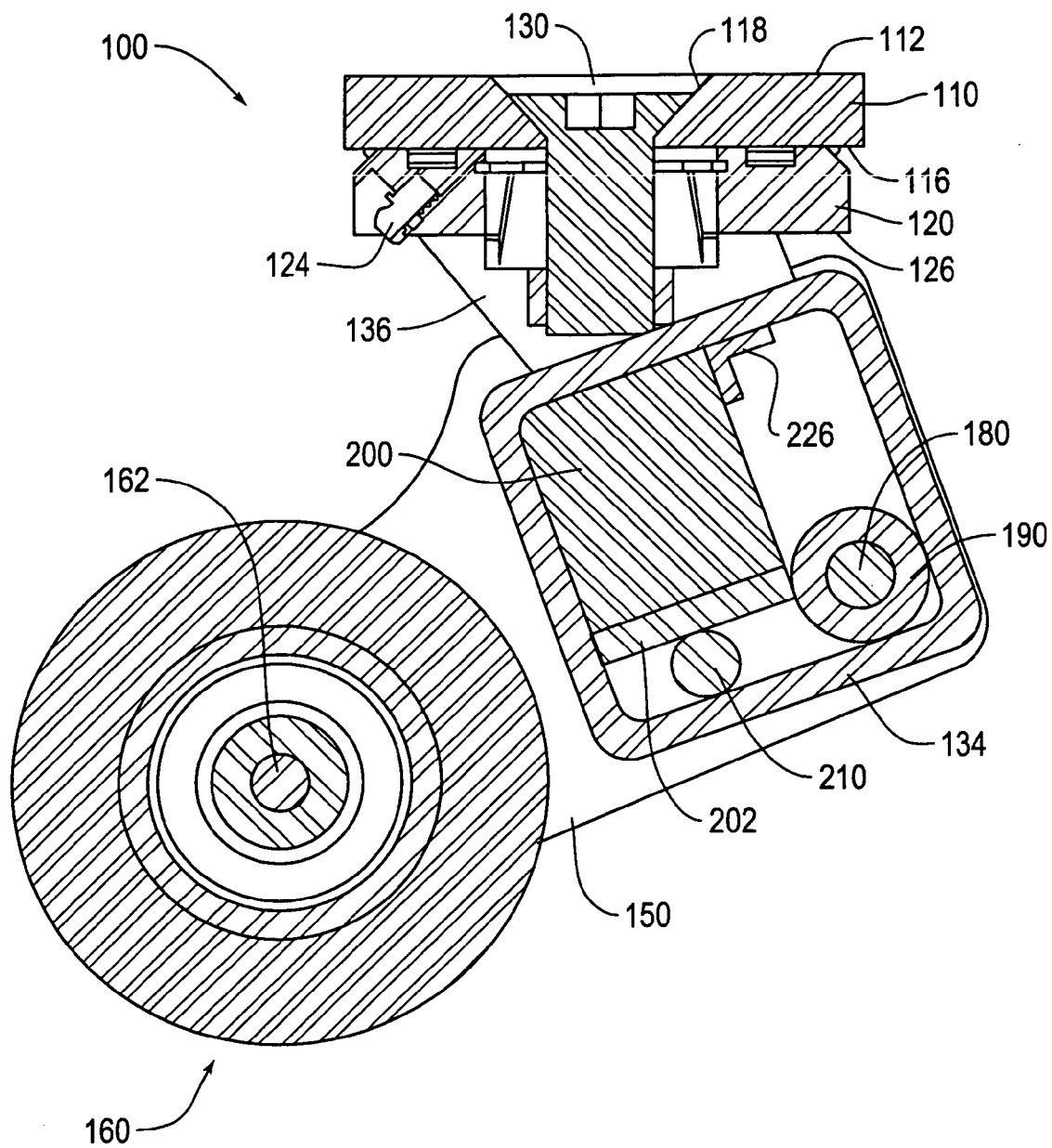
FIG. 5 is a vertical cross sectional view through a second exemplary embodiment of the spring caster wheel assembly according to this invention.

In various exemplary embodiments, as shown for example in FIG. 5, the height h and the width w of the elastomeric support member 200 and the height H and the width W of the housing 134 can be effectively rotated relative to the wheel 160 and the base member 110. However, it should be appreciated that by rotating the elastomeric support member 200 and housing 134, the housing 134 can be narrowed according to the respective dimensions of the height h and the width w of the elastomeric support member 200 and thus allow a smaller turning radius about the pivot axle 304.

Figure 6:
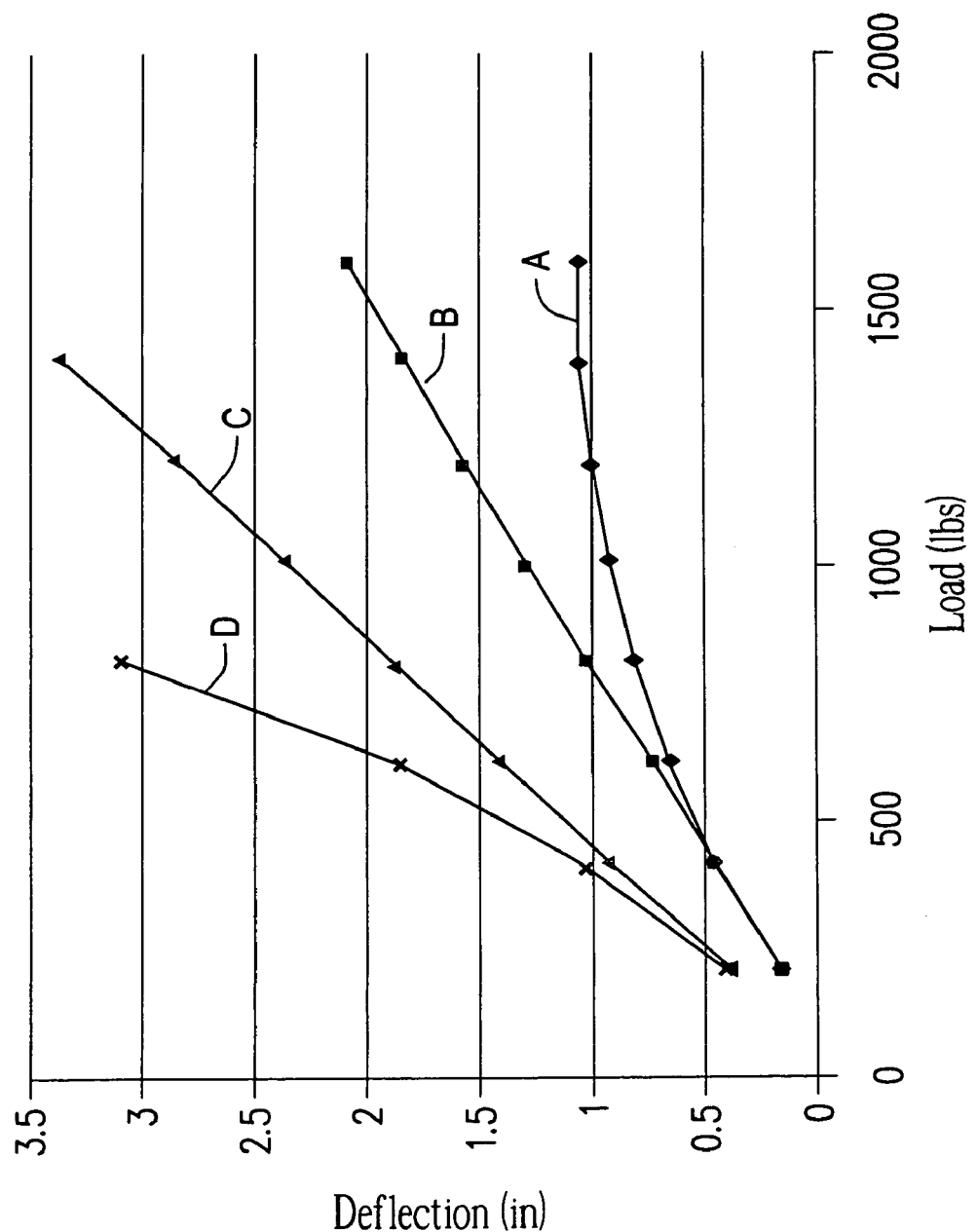
FIG. 6 is a graph plotting exemplary relationships between the load and the deflection provided by the spring caster wheel according to this invention.

FIG. 6 is a graph plotting a number of different deflection to load response curves. In various exemplary embodiments, the desired deflection response can be similar to the curve A shown in the deflection/load graph of FIG. 6. The curve A demonstrates a decreasing deflection rate with an increasing load that causes the industrial caster wheel assembly 100 to reach full deflection. However, it should be appreciated that the industrial caster wheel assembly 100 can reach full deflection under any load in order to accommodate elevation restrictions while avoiding hard mechanical stops or "jarring".

In various exemplary embodiments, the desired deflection response can be similar to curve B shown in the deflection/load graph of FIG. 6. The curve B demonstrates a linear deflection over a large deflection range. However, it should be appreciated that as the elastomeric support member 200 dampens the applied load, the industrial caster wheel assembly 100 remains steady as the elastomeric support member 200 smoothly compresses.

In various exemplary embodiments, the desired deflection response can be similar to the curve C shown in the deflection/load graph of FIG. 6. The curve C is the same as the curve B, except that the elastomeric support member 200 has a lower compression modulus. As a result, for the curve C, the elastomeric support member 200 also offers a larger deflection under similar loads.

In various exemplary embodiments, the desired deflection response can be similar to the curve D shown in the deflection/load graph of FIG. 6. The curve D shows an increasing deflection with an increased load. It should be appreciated that the curve D can be achieved by changing the location of the adjustable axle 210 relative to the elastomeric support member 200, so that the direction of force of the adjustable axle varies as the deflection increases. It should also be appreciated that, in the desired deflection response illustrated by the curve D, the industrial caster wheel assembly 100 offers stiff response for small loads and allows for an increasing deflection rate as the load increases.

In various exemplary embodiments, the elastomeric support member 200 can be formed from an elastomeric material having a hardness of approximately 50 Shore A to approximately 70 Shore D. In various exemplary embodiments, such an elastomeric material can be rubber or polyurethane.

In various exemplary embodiments, the elastomeric material forming the elastomeric member 200 can have a compression modulus of between around 650 psi and 5000 psi. However, it should be appreciated that any combination of one or more elastomeric materials having any combination hardness of that material and compression modulus of that material, where the combination of hardness and compression modulus provides a desired deflection response and/or range, can be used to form the elastomeric support member 200.

In various exemplary embodiments, the elastomeric support member 200 can be designed to have a resilience, as measured by Bayshore Rebound, that is between about 20% and about 80%. However, it should be appreciated that the elastomeric support member 200 is not limited to this resilience range. The rebound for the elastomeric support member 200 can be chosen to provide a desired amount of damping, mechanical resistance, or energy dissipation. In general, low rebound materials provide high damping or high energy dissipation, while high rebound materials provide a low damping or low energy dissipation. Thus, depending on the damping and energy dissipation requirements, one of ordinary skill in the art will readily appreciate how to select an appropriate material for the elastomeric member 200.

In various exemplary embodiments, the height and width of the elastomeric support member 200 can be chosen so that the compressive force applied to the elastomeric support member 200 does not exceed about 30% of the compression modulus of the combination of the one or more materials forming the elastomeric support member 200. However, it should be appreciated that maximum compressive force to be applied to the elastomeric support member 200 is not limited to this range of the compression modulus, so long as the elastomeric support member 200 has a reasonably useful life. In various exemplary embodiments, limiting the maximum compressive force applied to the elastomeric support member in this way reduces the strain on the elastomeric support member 200. This in turn reduces the susceptibility of the elastomeric material forming the elastomeric member 200 to fatigue failure due to the compressive force to be applied to elastomeric support member 200. In various exemplary embodiments, a typical range of the compressive force applied to the elastomeric support member 200 is between about 50 psi to about 900 psi. However, it should be appreciated that the elastomeric support member 200 can be used when the compressive force to be applied to the elastomeric support member 200 extends outside of this range in either direction.

In various exemplary embodiments, the width-to-height ratio of the elastomeric support member 200 can be chosen to ensure that the maximum strain on the elastomeric support member 200 does not substantially exceed a desired maximum strain. The desired maximum strain can be determined by the required deflection of the industrial caster wheel assembly 100. In various exemplary embodiments, the maximum desired strain is between about 5% and about 50%. In this case, the desired width-to-height ratio of the elastomeric support member 100 is between about 0.5 to about 2.0. However, it should be appreciated that neither the maximum or desired strain on, nor the width-to-height ratio of, the elastomeric support member 200 is limited to these ranges.

Figure 7:
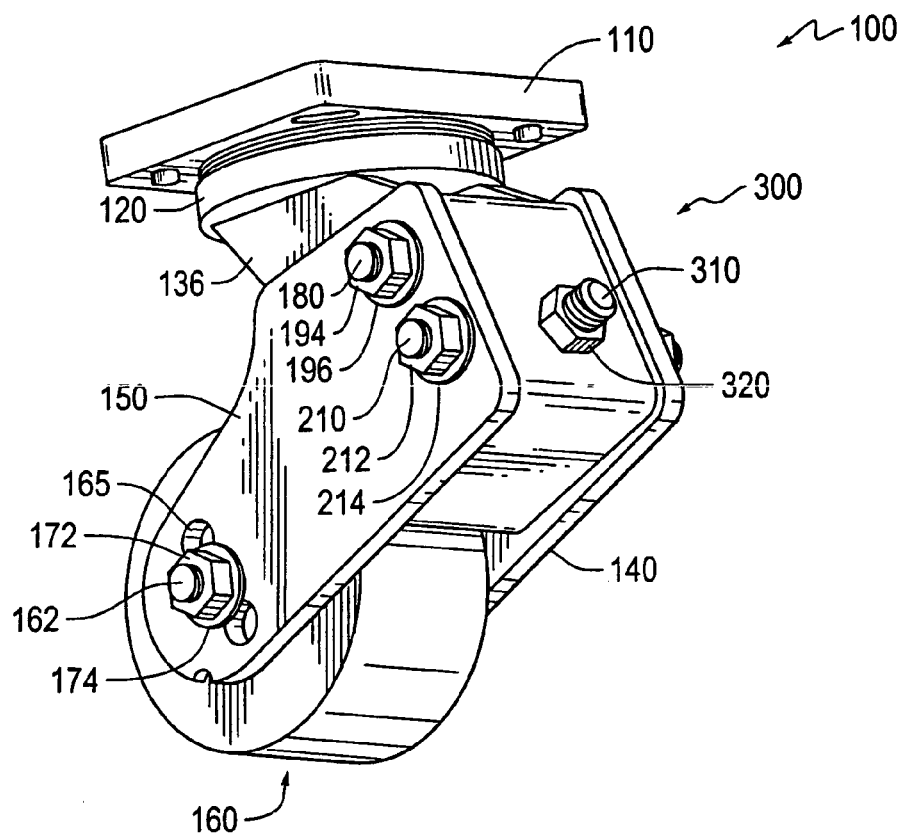
FIG. 7 is an isometric view of a third exemplary embodiment of a caster wheel assembly according to this invention.
Figure 8:
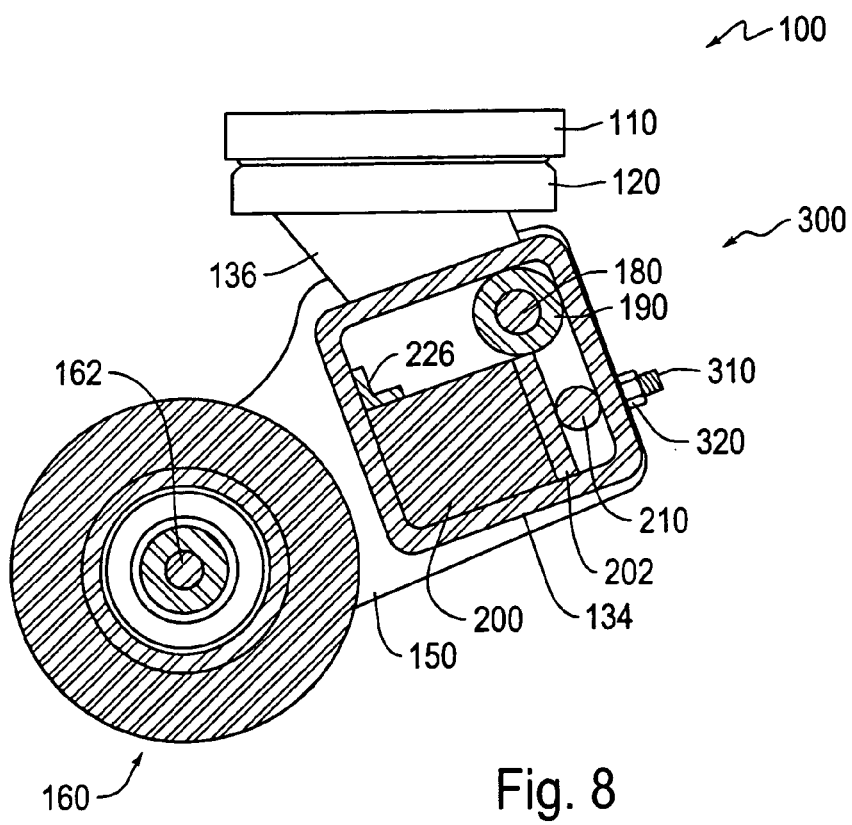
FIG. 8 is a vertical cross-sectional view of the caster wheel assembly of FIG. 7 when in a first position.
Figure 9:
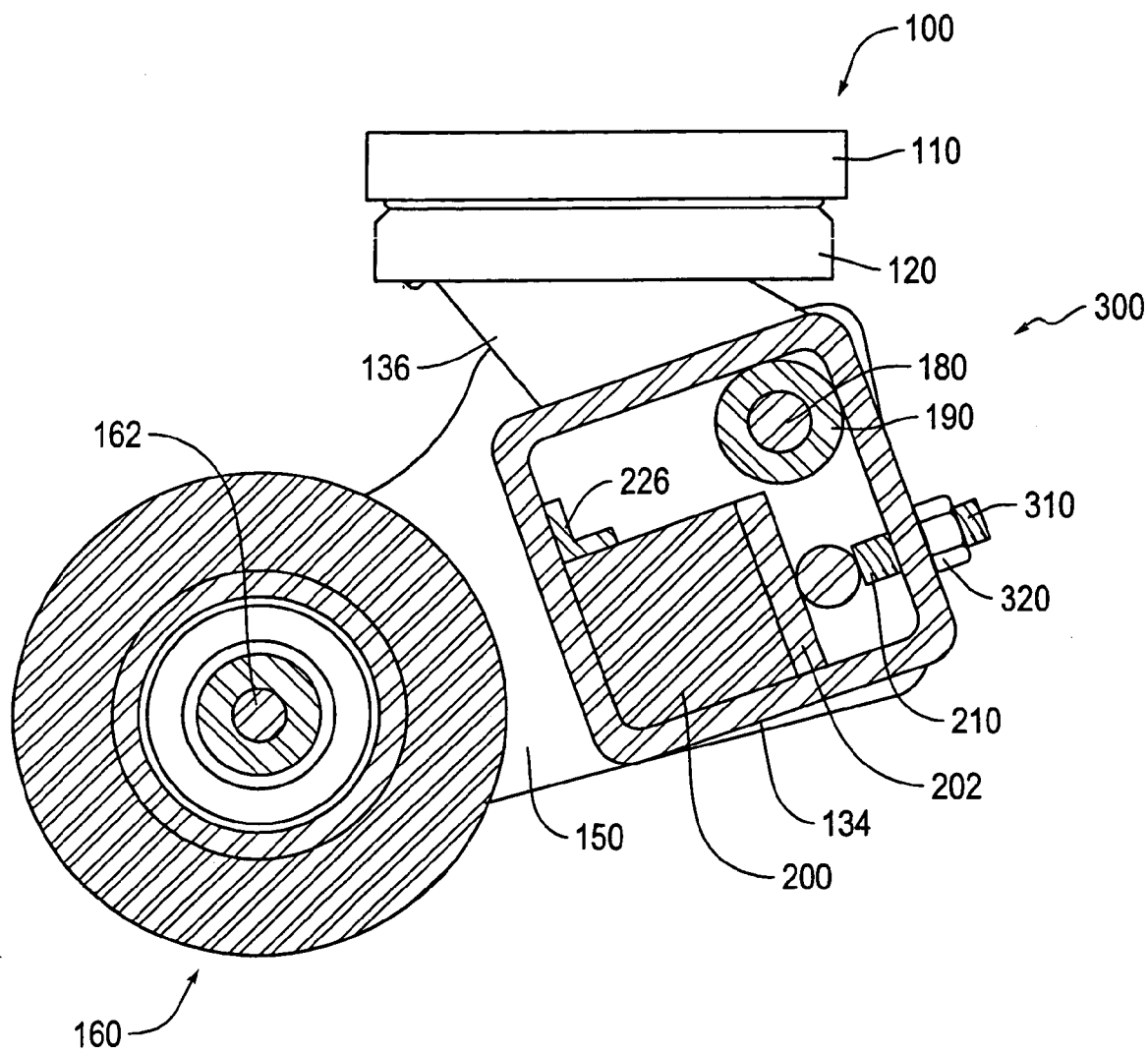
FIG. 9 is a vertical cross-sectional view of the caster wheel assembly of FIG. 7 when in a second position.

In various exemplary embodiments, as shown, for example, in FIGS. 7–9, the height of the industrial caster wheel assembly 100 can be adjusted by using an adjustment assembly 300 that includes at least an adjustment member. By adjusting the height, the industrial caster wheel assembly 100 can be adjusted for tire wear or to accommodate height variation in the equipment that is used on the industrial caster wheel assembly 100. FIG. 7 shows an isometric view of one exemplary embodiment of an industrial caster wheel assembly 100 according to this invention that includes one exemplary embodiment of an adjustment assembly 300 according to this invention. FIG. 8 shows the industrial caster wheel assembly 100 that includes the adjustment assembly 300 before a height adjustment is performed. In contrast, FIG. 9 shows the industrial caster wheel assembly 100 that includes the adjustment assembly 300 after a height adjustment has been performed.

In the exemplary embodiment of the adjustment assembly 300 shown in FIGS. 7–9, the adjustment assembly 300 includes an adjustment bolt 310 as the adjustment member and an adjustment nut 320 that is attached to the housing 134. The adjustment bolt 310 extends through a hole (not shown) in the housing 134 and through the adjustment nut 320 and is aligned such that the adjustment bolt 310 can come into contact with the adjustable axle 210. In various exemplary embodiments, the adjustment nut 320 is attached to the housing 134 by any known or later developed attachment method. In other various exemplary embodiments, it is not necessary to attach the adjustment nut 320 to the housing. In various other exemplary embodiments, the hole in the housing 134 is threaded to accept the adjustment bolt 310. In this case, the adjustment nut 320 can be omitted. Thus, it is not necessary to use the adjustment nut 320.

In various other exemplary embodiments, the adjustment member of the adjustment assembly 300 is a stepped beam which extends through a hole in the housing 134 and is locked in position by one of the steps coming into contact with an interior surface of the housing 134. In various other exemplary embodiments, the adjustment assembly 300 includes a sleeve attached to the housing 134 and a rod that passes through the sleeve as the adjustment member. In this case, in various exemplary embodiments, the rod is held in place by a set screw that passes through the sleeve and bears against the rod. In various other exemplary embodiments, the inner or outer surface of the sleeve is threaded, such that a compression nut can be screwed onto the sleeve to form a compression fitting around the rod. Of course, it should be appreciated that, in various exemplary embodiments, the sleeve can be replaced with any other structure usable either to hold a set screw or onto which a compression nut can be mounted.

In still further exemplary embodiments, the sleeve can be provided with one or more sets of opposing holes. In this case, the rod can be provided with one or more correspondingly placed passages such that a retaining member can be inserted through one of one or more sets of holes in the sleeve and one of the one or more passages in the rod to hold the rod in a given position relative to the sleeve and thus to the housing 134 and the adjustable axle 210. In various exemplary embodiments, the sets of holes and the passages are each provided at different spacings to provide a broad range of relative positions between the sleeve and the rod at which the rod can be held. In various exemplary embodiments, the retaining member can be a cotter pin or the like. In various other exemplary embodiments, the rod can be provided with an axially extending pin or equivalent extension member. In this case, the sleeve can be provided with an elongated slot having steps or detents at which the extension member can be held. The relative position between the rod and the sleeve can then be adjusted by moving the rod relative to the sleeve such that the extension member is held at a different detent.

In still other exemplary embodiments, the sleeve can be omitted, with the rod provided with a number of axially extending extension members. In this case, the hole in the housing 134 through which the rod extends can include a slot through with the extension members can pass when the rod is in the correct position. In this case, the position of the rod relative to the housing 134 can be adjusted by aligning the extension members with the slot and moving the rod in or out of the hole. Once the desired relative position is obtained, the rod is then rotated so that one of the extension members bears against the inner surface of the housing 134 to hold the rod in place.

In various other exemplary embodiments, the side plates 140 and 150 can include stepped slots extending along the side of the side plates 140 and 150 instead of the holes 218 and 220. In this case, in various other exemplary embodiments, the adjustable axle 210 is held in place by one of the stepped slots. In this case, the adjustment member can be implemented using any currently-available or later-developed device and/or structure that can move the adjustable axle 210 into any one of the stepped slots. Of course, it should be appreciated, in various exemplary embodiments, the housing 134 or side plates 140 and 150 can be adjusted such that the adjustable axle 210 is held at a variably fixed position by the housing 134 or side plates 140 and 150.

In other exemplary embodiments, the adjustable axle 210 can be pulled. In this case, the adjustment bolt 310 extends through a hole at one end of the housing 134, the plate 202, the elastic support member 200 and other end of housing 134. Furthermore, the adjustment bolt 310 has a ring (not shown) aligned such that the ring comes into contact with the adjustable axle 210. As such, the adjustable axle 210 can be pushed or pulled depending on the side of the housing 134 in which the adjustment bolt 310 is adjusted.

In other exemplary embodiments, the adjustment member of the adjustment assembly 300 can come into contact with the adjustable axle 210 at one or more positions located outside of the housing 134 or outside of the side plates 140 and 150. However, it should be appreciated that any known or later developed structure that is able to move the adjustable axle 210 relative to the housing 134 and that can hold the adjustable axle 210 in the moved position relative to the housing 134 can be used to implement the adjustment assembly 300.

By rotating one of the adjustment bolt 310 or the adjustment nut 320 in a first direction, the adjustment bolt 310 is moved in a first direction toward the adjustable axle 210 to press the adjustable axle 210 toward the interior of the housing 134. By moving the adjustable axle 210 toward the interior of the housing 134, the adjustable axle 210 compresses the elastomeric support member 200 by contacting and bearing or pressing against the plate 202. As shown in FIG. 9, by moving the adjustable axle 210 toward the interior of the housing 134, the pivot axle 180 is also rotated relative to the housing 134 such that the height of the housing 134 is also reduced. The adjustable axle 210 and the pivot axle 180 rotate together because, as discussed above, both are fixed to the side plates 140 and 150.

As such, the height of the industrial caster wheel assembly 100 can be adjusted by at least one or two inches, depending on the design of the industrial casting wheel assembly 100, by moving the adjustment bolt 310 toward the interior of the housing 134. Furthermore, the preload stress applied to the elastomeric support member 200 can also be increased by moving the adjustment bolt 310 toward the interior of the housing 134. It should be appreciated that hard mechanical stops or "jarring" can be further avoided by applying a predetermined amount of preload stress to the elastomeric support member 200. By applying a predetermined amount of preload stress, the response time in which the elastomeric support member 200 accommodates shock loads is increased.

By rotating one of the adjustment bolt 310 or the adjustment nut 320 in a second direction, the adjustment bolt 320 is moved away from the interior of the housing 134. Accordingly, the preload stress applied by the adjustable axle 210 on the elastomeric support member 200 by contacting the plate 202 is reduced. Also, the height of the industrial caster wheel assembly 100 is increased. However, it should be appreciated that the industrial caster wheel assembly 100 could also be modified so that moving the adjustable axle 210 toward and way from the interior of the housing 134 does not also reduce and increase the height of the housing 134, respectively. In general, the adjustment assembly 300 can be any known or later developed structure that can hold or maintain the position of the adjustable axle 210 relative to the housing 134 and/or the elastomeric support member 200.

Figure 10:
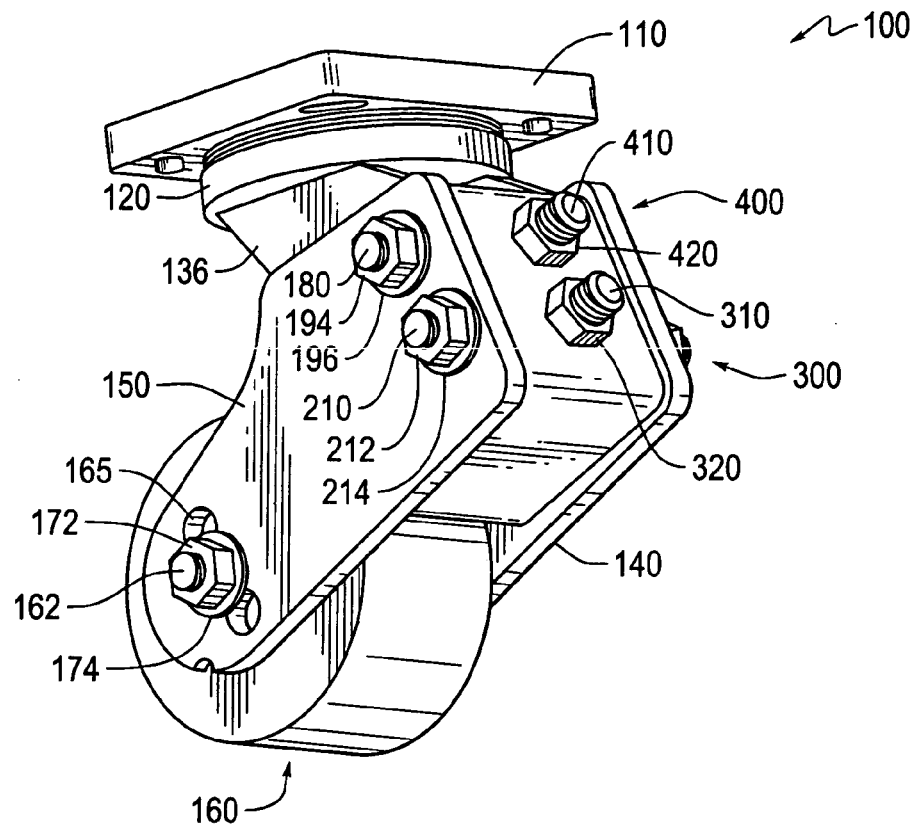
FIG. 10 is an isometric view of a fourth exemplary embodiment of a caster wheel assembly according to this invention.
Figure 11:
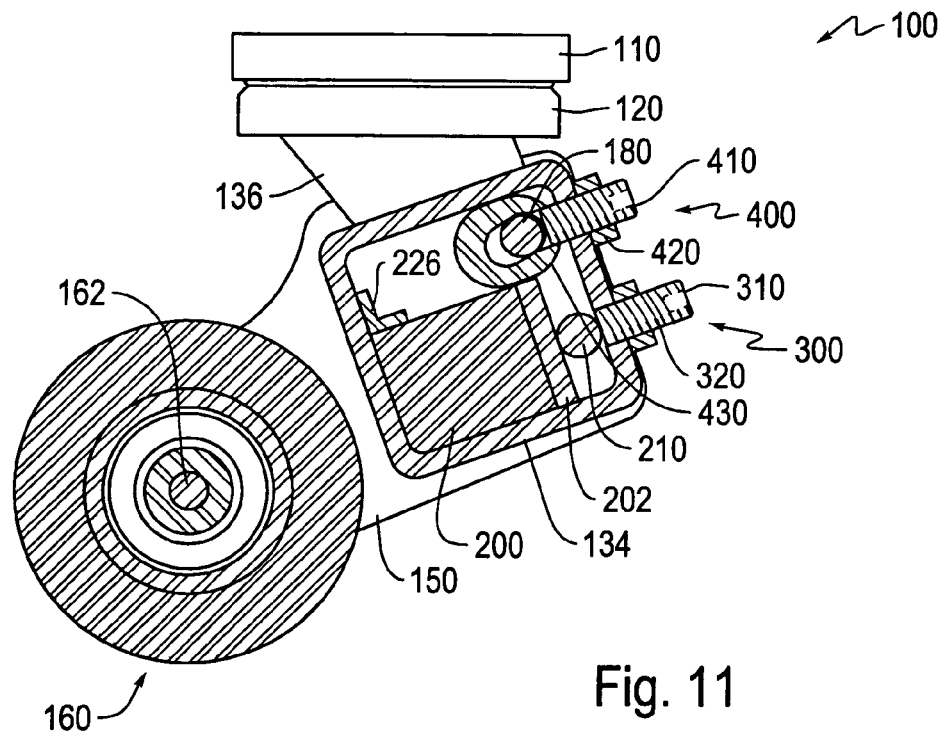
FIG. 11 is a vertical cross-sectional view of the caster wheel assembly of FIG. 10 when in a first position.
Figure 12:
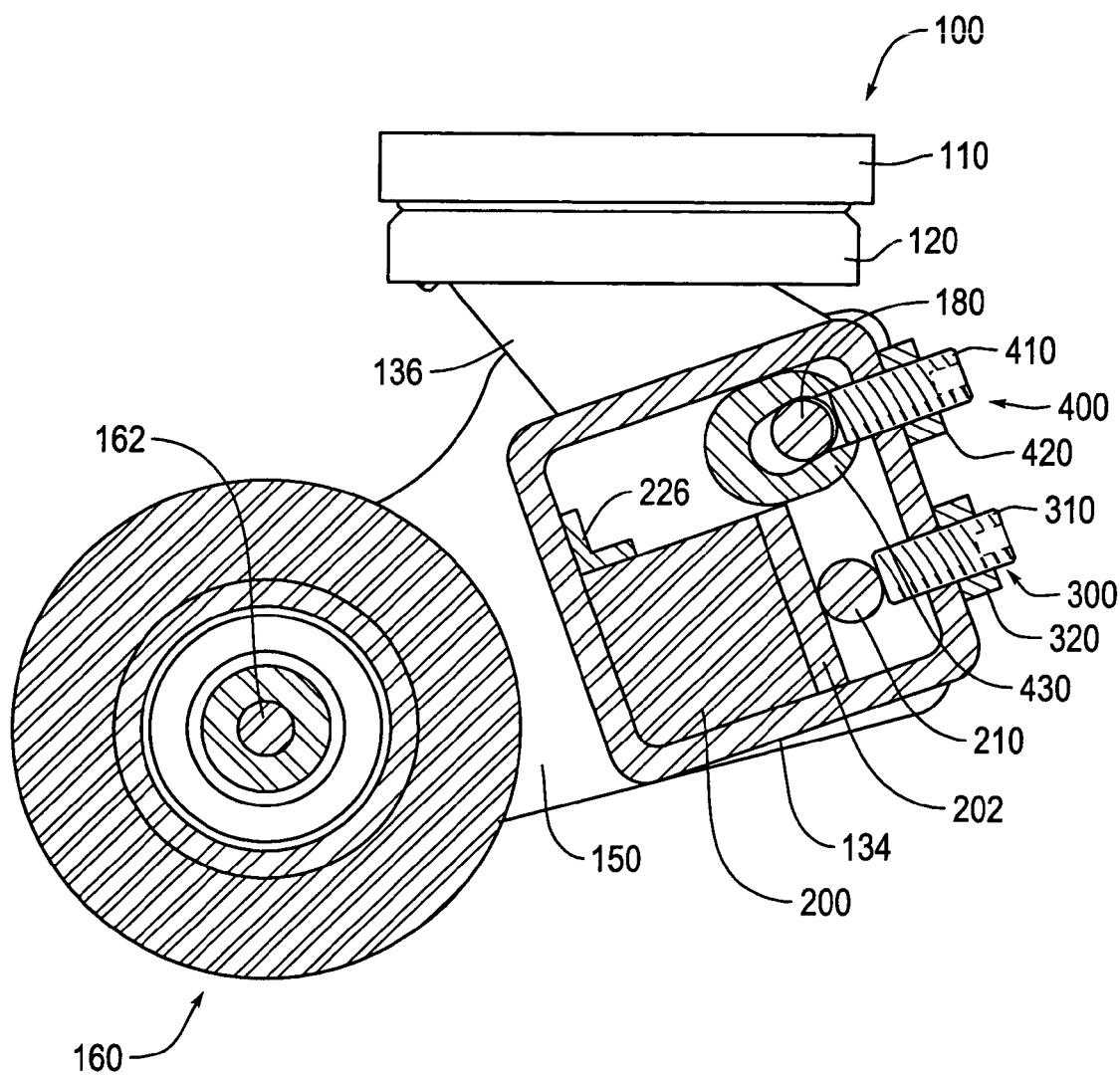
FIG. 12 is a vertical cross-sectional view of the caster wheel assembly of FIG. 10 when in a second position.
Figure 13:
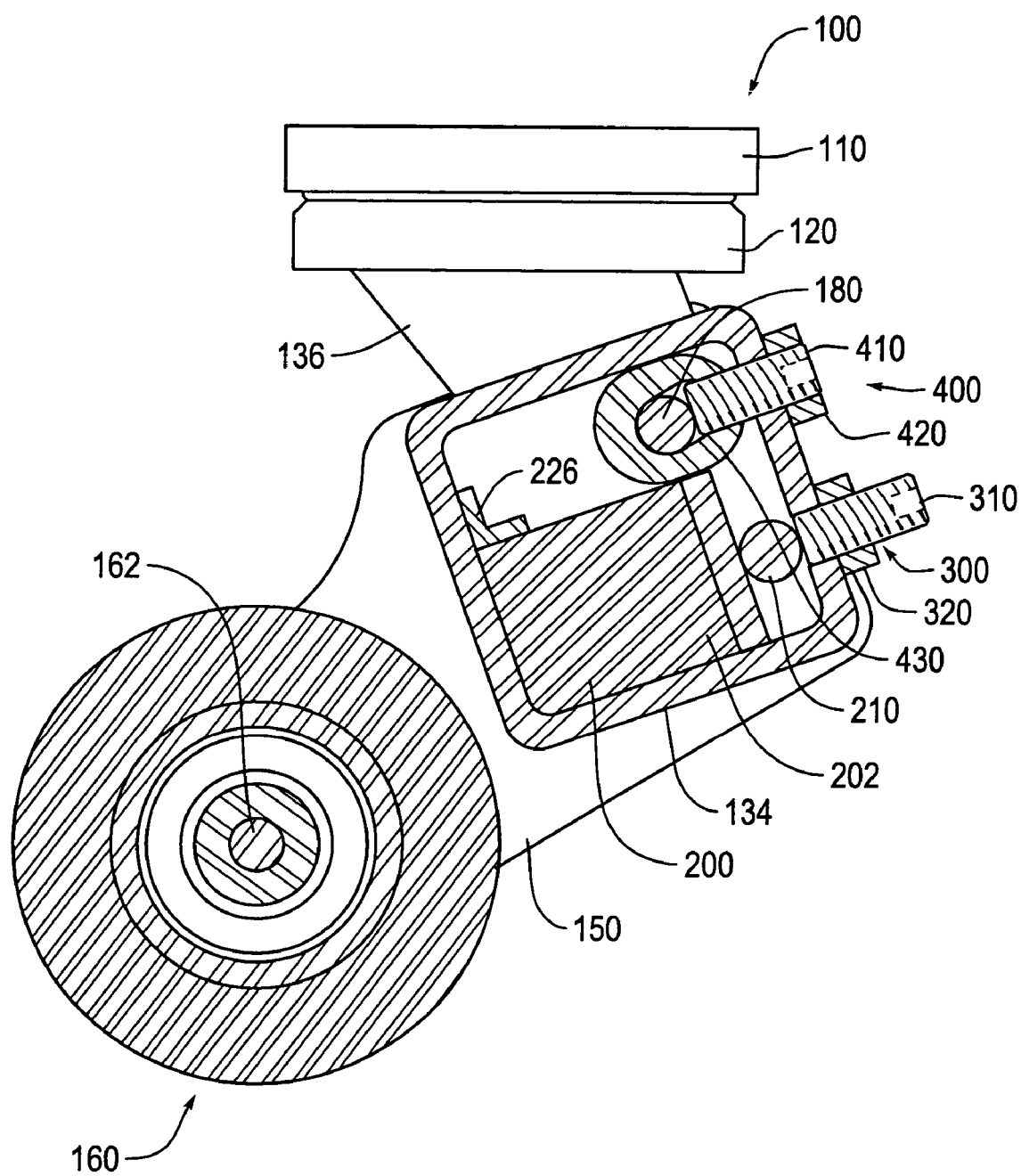
FIG. 13 is a vertical cross-sectional view of the caster where assembly of FIG. 10 when in a third position.

In various exemplary embodiments, as shown, for example, in FIGS. 10–13, the height of the industrial caster wheel assembly 100 can be adjusted by using one or both of a first adjustment assembly 300 and a second adjustment assembly 400 that each includes at least an adjustment member 310 or 410, respectively. By adjusting the height, the industrial caster wheel assembly 100 can be adjusted for tire wear or to accommodate height variation in the equipment that is used on the industrial caster wheel assembly 100. FIG. 10 shows an isometric view of one exemplary embodiment of an industrial caster wheel assembly 100 according to this invention that includes one exemplary embodiment of the first adjustment assembly 300 and one exemplary embodiment of the second adjustment assembly 400 according to this invention. FIG. 11 shows the industrial caster wheel assembly 100 that includes the first adjustment assembly 300 and the second adjustment assembly 400 before any height adjustment is performed. In contrast, FIG. 12 shows the industrial caster wheel assembly 100 after a first height adjustment has been performed by adjusting only the first adjustment assembly 300. In contrast to both FIGS. 11 and 12, FIG. 13 shows the industrial caster wheel assembly 100 after a second height adjustment has been performed by adjusting only the second adjustment assembly 400.

In the exemplary embodiment of the first adjustment assembly 300 shown in FIGS. 10–12, the first adjustment assembly 300 is generally the same as shown in FIGS. 7–9, and thus the details of the first adjustment assembly 300 are provided above and will not be repeated. In the exemplary embodiment of the second adjustment assembly 400 shown in FIGS. 10–13, the second adjustment assembly 400 includes an adjustment bolt 410 as the adjustment member and an adjustment nut 420 that is attached to the housing 134. The adjustment bolt 410 extends through a hole (not shown) in the housing 134, through the adjustment nut 420 and through an elongated pivot bushing 430 and is aligned such that the adjustment bolt 410 can come into contact with the pivot axle 180. In various exemplary embodiments, the adjustment nut 420 is attached to the housing 134 by any known or later developed attachment method. In other various exemplary embodiments, it is not necessary to attach the adjustment nut 420 to the housing. In still other exemplary embodiments, the hole in the housing 134 is threaded to accept the adjustment bolt 410. In this case, the adjustment nut 420 can be omitted. Thus, it is not necessary to use the adjustment nut 420.

In various other exemplary embodiments, the adjustment member of the second adjustment assembly 400 is a stepped beam which extends through a hole in the housing 134 and is locked in position by one of the steps coming into contact with an interior surface of the housing 134. In various other exemplary embodiments, the second adjustment assembly 400 includes a sleeve attached to the housing 134 and a rod that passes through the sleeve as the adjustment member. In this case, in various exemplary embodiments, the rod is held in place by a set screw that passes through the sleeve and bears against the rod. In various other exemplary embodiments, the inner or outer surface of the sleeve is threaded, such that a compression nut can be screwed onto the sleeve to form a compression fitting around the rod. Of course, it should be appreciated that, in various exemplary embodiments, the sleeve can be replaced with any other structure usable either to hold a set screw or onto which a compression nut can be mounted.

In still further exemplary embodiments, the sleeve can be provided with one or more sets of opposing holes. In this case, the rod can be provided with one or more correspondingly placed passages such that a retaining member can be inserted through one of one or more sets of holes in the sleeve and one of the one or more passages in the rod to hold the rod in a given position relative to the sleeve and thus to the housing 134 and the pivot axle 180. In various exemplary embodiments, the sets of holes and the passages are each provided at different spacings to provide a broad range of relative positions between the sleeve and the rod at which the rod can be held. In various exemplary embodiments, the retaining member can be a cotter pin or the like. In various other exemplary embodiments, the rod can be provided with an axially extending pin or equivalent extension member. In this case, the sleeve can be provided with an elongated slot having steps or detents at which the extension member can be held. The relative position between the rod and the sleeve can then be adjusted by moving the rod relative to the sleeve such that the extension member is held at a different detent.

In still other exemplary embodiments, the sleeve can be omitted, with the rod provided with a number of axially extending extension members. In this case, the hole in the housing 134 through which the rod extends can include a slot through with the extension members can pass when the rod is in the correct position. In this case, the position of the rod relative to the housing 134 can be adjusted by aligning the extension members with the slot and moving the rod in or out of the hole. Once the desired relative position is obtained, the rod is then rotated so that one of the extension members bears against the inner surface of the housing 134 to hold the rod in place.

In various other exemplary embodiments, the side plates 140 and 150 can include stepped slots extending along the side of the side plates 140 and 150 instead of the holes 188 and 192. In this case, in various other exemplary embodiments, the pivot axle 180 is held in place by one of the stepped slots. In this case, the adjustment member can be implemented using any currently-available or later-developed device and/or structure that can move the pivot axle 180 into any one of the stepped slots. Of course, it should be appreciated, in various exemplary embodiments, the housing 134 or side plates 140 and 150 can be adjusted such that the pivot axle 180 is held at a variably fixed position by the housing 134 or side plates 140 and 150.

In other exemplary embodiments, the pivot axle 180 can be pulled. In this case, the adjustment bolt 410 extends through a hole at one end of the housing 134, the elongated pivot bushing 430 and other end of housing 134. Furthermore, the adjustment bolt 410 has a ring (not shown) aligned such that the ring comes into contact with the pivot axle 180. As such, the pivot axle 180 can be pushed or pulled depending on the side of the housing 134 in which the adjustment bolt 410 is adjusted.

In other exemplary embodiments, the adjustment member of the second adjustment assembly 400 can come into contact with the pivot axle 180 at one or more positions located outside of the housing 134 or outside of the side plates 140 and 150. However, it should be appreciated that any known or later developed structure that is able to move the pivot axle 180 relative to the housing 134 and that can hold the pivot axle 180 in the moved position relative to the housing 134 can be used to implement the second adjustment assembly 400.

By rotating one of the adjustment bolt 410 or the adjustment nut 420 in a first direction, the adjustment bolt 410 is moved in a first direction toward the pivot axle 180 to press the pivot axle 180 toward the interior of the housing 134. By moving the pivot axle 180 toward the interior of the housing 134, the pivot axle 180 is also moved toward the interior of the elongated pivot bushing 430. As shown in FIG. 13, by moving the pivot axle 180 toward the interior of the housing 134, the pivot axle 180 is rotated relative to the housing 134 such that the height of the housing 134 increases.

As shown in FIG. 13, the adjustable axle 210 and the pivot axle 180 rotate together because, as discussed above, both are fixed to the side plates 140 and 150. However, the adjustable axle 210 remains in the same position relative to the elastomeric support member 200 and plate 202. As such, pressure is not applied to the elastomeric support member 200 by moving the adjustment bolt 410 in the first direction. As such, the height of the industrial caster wheel assembly 100 can be variably adjusted independently of the elastomeric support member 200, depending on the design of the industrial casting wheel assembly 100, by moving the adjustment bolt 410 toward the interior of the housing 134.

By rotating one of the adjustment bolt 410 or the adjustment nut 420 in a second direction, the adjustment bolt 410 is moved away from the interior of the housing 134 and from the interior of the elongated pivot bushing 430. Accordingly, the height of the industrial caster wheel assembly 100 decreases.

In general, the second adjustment assembly 400 can be any known or later developed structure that can hold or maintain the position of the pivot axle 180 relative to the housing 134. It should also be appreciated that the industrial caster wheel assembly 100 can include only the second adjustment assembly 400 and omit the first adjustment assembly 300. As such, the industrial caster wheel assembly 100 would include the second adjustment assembly 400 with the adjustment bolt 410 extending through a hole (not shown) in the housing 134, through the adjustment nut 420 and through the elongated pivot bushing 430 and is aligned such that the adjustment bolt 410 can come into contact with the pivot axle 180. The height of the industrial caster wheel assembly 100 is thus adjusted by adjusting the pivot axle 180 relative to the housing 134.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An industrial caster wheel assembly, comprising:
   a plurality of side plates, each side plate having an inside wall;
   a housing positioned between the inside walls of at least two of the plurality of the side plates;
   a first axle supported by at least two of the plurality of side plates and extending through the housing, the housing rotatable relative to the at least two side plates around the first axle;
   a second axle supported by at least two of the plurality of side plates and extending through the housing;
   an elastomeric support member positioned in the housing adjacent to the first and second axles, wherein, when the housing rotates relative to the at least two side plates about the first axle, the second axle compresses the elastomeric support member; and
   an adjustment member that can be placed in contact with the second axle to press the second axle at least indirectly against the elastomeric support member.

2. The industrial caster wheel assembly of claim 1, further comprising a base member supported by the housing.

3. The industrial caster wheel assembly of claim 2, wherein an edge of the plurality of side plates provide a deflection stop when in contact with the base member.

4. The industrial caster wheel assembly of claim 1, further comprising:
   a wheel arranged at a respective side of at least two of the plurality of side plates; and
   a third axle that supports the wheel, the wheel rotatable around a first axis, the third axle supported by the at least two of the plurality of side plate.

5. The industrial caster wheel assembly of claim 4, further comprising a plurality of holes formed in the at least two of the plurality of side plates usable to adjust a position of the third axle relative to the elastomeric member.

6. The industrial caster wheel assembly of claim 1, further comprising a tab positioned on an inside wall of the housing that restricts movement of the elastomeric support member.

7. The industrial caster wheel assembly of claim 1, further comprising a plurality of holes formed in the at least two of the plurality of side plates usable to adjust a position of the second axle based on a size of the elastomeric support member.

8. The industrial caster wheel assembly of claim 1, wherein each side edge of the plurality of side plates is curved.

9. The industrial caster wheel assembly of claim 1, further comprising a pivot bushing extending between the side plates and surrounding the first axle within the housing.

10. The industrial caster wheel assembly of claim 1, further comprising a rigid plate positioned between the second axle and the elastomeric support member, wherein the second axle compresses the elastomeric support member by contacting the rigid plate.

11. The industrial caster wheel assembly of claim 10, wherein the second axle compresses the elastomeric support member by contacting the rigid plate at approximately the midpoint of a first dimension of the elastomeric support member.

12. The industrial caster wheel assembly of claim 1, wherein the geometry of the elastomeric support member is selected to obtain a desired deflection response.

13. The industrial caster wheel assembly of claim 1, wherein a geometry of the elastomeric support member is selected to achieve a range of pressure from 50 psi to 900 psi.

14. The industrial caster wheel assembly of claim 1, wherein the elastomeric support member has a width-to-height ratio of about 0.5 to about 2.0.

15. The industrial caster wheel assembly of claim 1, wherein at least one of a hardness and a compression modulus of the elastomeric support member is selected to obtain a desired deflection response.

16. The industrial caster wheel assembly of claim 1, wherein the hardness of the elastomeric support member ranges from about 50 Shore A to about 70 Shore D.

17. The industrial caster wheel assembly of claim 1, wherein the compression modulus of the elastomeric support member ranges from about 650 psi to about 5,000 psi.

18. The industrial caster wheel assembly of claim 1, wherein a Bayshore Rebound of the elastomeric support member is about 20% and about 80%.

19. The industrial caster wheel assembly of claim 1, wherein a strain of the elastomeric support member while under compression is between about 5% to about 50%.

20. The industrial caster wheel assembly of claim 1, wherein, when the adjustment member moves the second axle in a first direction, the second axle compresses the elastomeric support member.

21. The industrial caster wheel assembly of claim 1, wherein, when the adjustment member moves the second axle, the plurality of side plates move relative to the housing.

22. The industrial caster wheel assembly of claim 21, wherein, when the adjustment member is moved in a first direction, the plurality of side plates move relative to the housing to reduce a height of the industrial caster wheel assembly.

23. The industrial caster wheel assembly of claim 1, wherein the adjustment member is a threaded member that is threaded into at least one of a threaded hole in the housing and a threaded member attached to the housing.

24. The industrial caster wheel assembly of claim 1, further comprising:
a second adjustment member that can be placed in contact with the first axle to adjust a position of the first axle relative a center of the housing.

25. The industrial caster wheel assembly of claim 24, wherein, when the second adjustment member moves the first axle, the plurality of side plates move relative to the housing.

26. The industrial caster wheel assembly of claim 24, wherein, when the second adjustment member is moved in a first direction, the plurality of side plates move relative to the housing to increase a height of the industrial caster wheel assembly.

27. The industrial caster wheel assembly of claim 24, wherein, when the second adjustment member is moved in a first direction, the plurality of side plates move relative to the housing to decrease a height of the industrial caster wheel assembly and when the second adjustment member is moved in a second direction, the plurality of side plates move relative to the housing to increase a height of the industrial caster wheel assembly.

28. An industrial caster wheel assembly, comprising:
a plurality of side plates, each side plate having an inside wall;
a housing positioned between the inside walls of at least two of the plurality of the side plates;
a first axle supported by at least two of the plurality of side plates and extending through the housing, the housing rotatable relative to the at least two side plates around the first axle;
a second axle supported by at least two of the plurality of side plates and extending through the housing;
an elastomeric support member positioned in the housing adjacent to the first and second axles, wherein, when the housing rotates relative to the at least two side plates about the first axle, the second axle compresses the elastomeric support member; and
at least one adjustment member for at least one of the first and second axles, each adjustment member usable to adjust a position of a corresponding one of the first and second axles relative to the housing.

29. The industrial caster wheel assembly of claim 28, wherein the at least one adjustment member comprises a first adjustment member usable to move the second axle in a first direction to compress the elastomeric support member.

30. The industrial caster wheel assembly of claim 29, wherein the at least one adjustment member further comprises a second adjustment member usable to adjust a position of the second axle relative to a center of the housing.

31. The industrial caster wheel assembly of claim 28, wherein the at least one adjustment member includes a first adjustment member that can be placed in contact with the first axle and a second adjustment member that can be placed in contact with the second axle.

32. The industrial caster wheel assembly of claim 31, wherein, when the second adjustment member is moved in a first direction, the plurality of side plates move relative to the housing to decrease a height of the industrial caster wheel assembly and when the second adjustment member is moved in a second direction, the plurality of side plates move relative to the housing to increase a height of the industrial caster wheel assembly.

33. The industrial caster wheel assembly of claim 28, wherein the at least one adjustment member comprises a second adjustment member usable to adjust a position of the second axle relative to a center of the housing.

* * * * *